INVENTOR.
TALLMON E. HORST
BY
William R. Piper
ATTORNEY.

July 28, 1970 T. E. HORST 3,521,979
DUAL-DRIVE ROTARY ENGINE
Filed Nov. 25, 1968 4 Sheets-Sheet 4
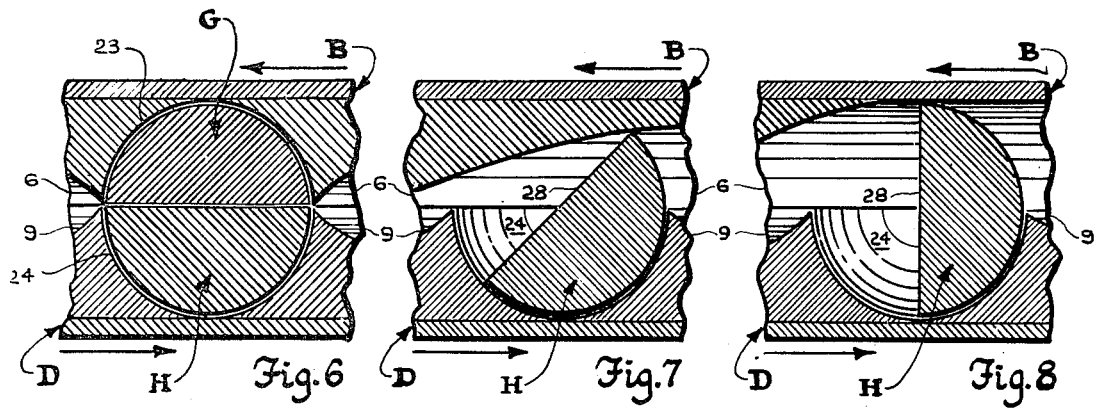
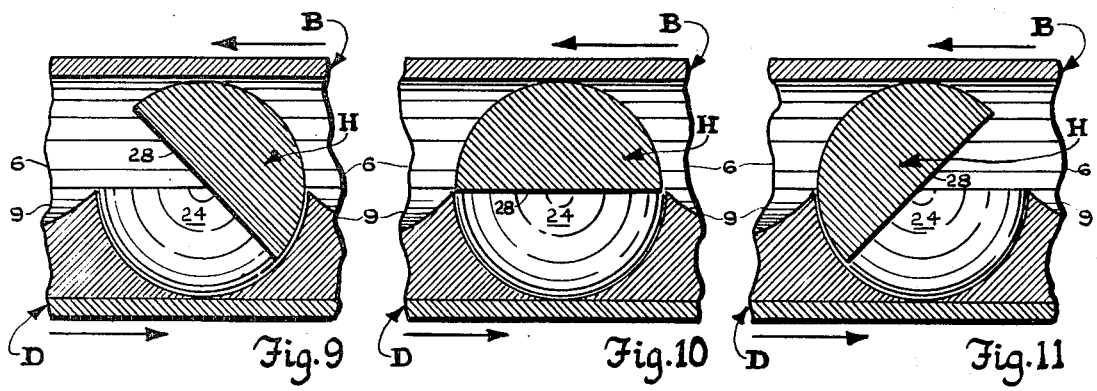
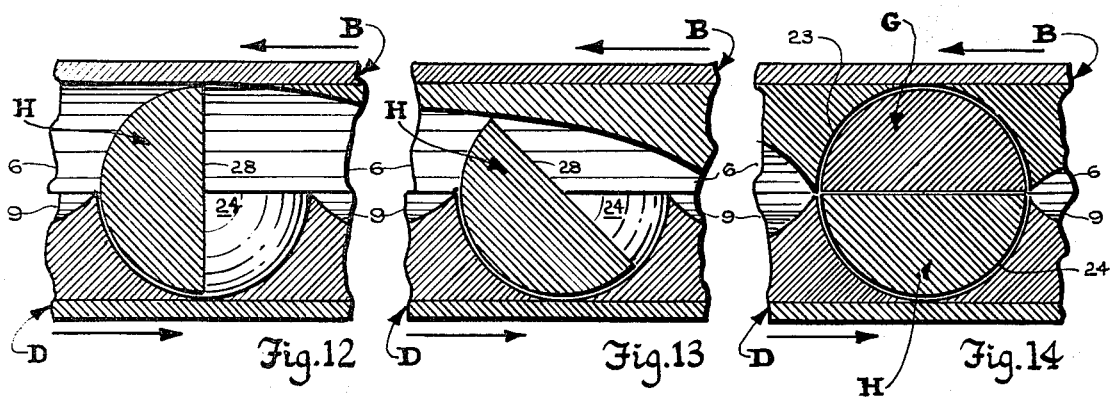
INVENTOR.
TALLMON E. HORST
BY
William R. Piper
ATTORNEY United States Patent Office 3,521,979
Patented July 28, 1970

3,521,979
DUAL-DRIVE ROTARY ENGINE
Tallmon E. Horst, Box 377, Boulder Creek, Calif. 95006
Filed Nov. 25, 1968, Ser. No. 778,392
Int. Cl. F01c 1/00; F02b 53/00
U.S. Cl. 418—34                                      7 Claims

ABSTRACT OF THE DISCLOSURE

A dual-drive rotary engine comprising two oppositely rotating rotors forming the greater part of a toroidal chamber assembly therebetween such that the near-toroidal assembly is parted into two lateral halves or rotors, each rotor carrying a thrust head slidably received in the opposite semi-toroidal chamber and constituting a sliding closure therein, each thrusthead being rotatable on an axis that extends radially from the common axis of the rotors, the shapes of the two thrustheads and the speed of their rotations on their own radial axes being such that they are able to pass each other during the counter rotation of the rotors. The engine can be used as a pump or for producing mechanical torque.

BACKGROUND OF THE INVENTION

Field of the invention

The dual-drive rotary engine performs substantially the same function as ordinarily performed by the well-known combination of piston, cylinder and crankshaft. The tightly closed toroidal chamber is comparable to the cylinder in a two or four cycle engine in which the expansion of gas under pressure takes place. The power from this pressure is transmitted to the shaft to be rotated but in contrast to the usual reciprocating piston and piston rod, my engine applys a continuous and uninterrupted rotary motion to the output shaft. All moving parts of the engine rotate in a continuous direction with uninterrupted motion, one rotor rotating continuously in one direction and the other rotor rotating continuously in the opposite direction.

SUMMARY OF THE INVENTION

An object of my invention is to combine the advantages of the piston cylinder type mechanisms with those of turbines while at the same time eliminating many disadvantages of both, thus producing an engine having higher efficiency. A very high power to weight ratio is achieved. The pressure of the expanding fluid is applied against the thrust head and also against the opposite closed end of the semi-toroid. The rotors may have near constant rotating pressure applied against them and this results in a constant leverage being applied on the load through most of the rotating cycle. The number of working parts is greatly reduced and this reduces friction. Vibration is cut down because there are no reciprocating parts. All revolving parts are properly counterbalanced. The engine can be operated by any expanding fluid such as steam or a fluid under pressure and lends itself to an adaptation that can be operated like an internal combustion engine. The engine will serve equally as well for various types of pumps or blowers. It will perform more smoothly and do a more efficient job than the standard internal combustion engine and it will require far less space and be of a lighter weight while developing the same or a greater horsepower.

BRIEF DESCRIPTION OF THE DRAWINGS

FIG. 4 is also a section through the two rotors rather than a diagrammatic showing.

FIGS. 6 to 14 inclusive show portions of the two rotors in section with one or the thrustheads rotating on its radial axis and being illustrated in successive increments of rotation of 45° each. The shape of the end of one of the toroidal expansion chamber portions in one of the rotors is also shown to illustrate how the thrusthead, rotatably carried by the other rotor, continually fills the cross sectional area of the chamber of the first rotor as the thrusthead is moved along this chamber.

DESCRIPTION OF THE PREFERRED EMBODIMENT

Figure 1:
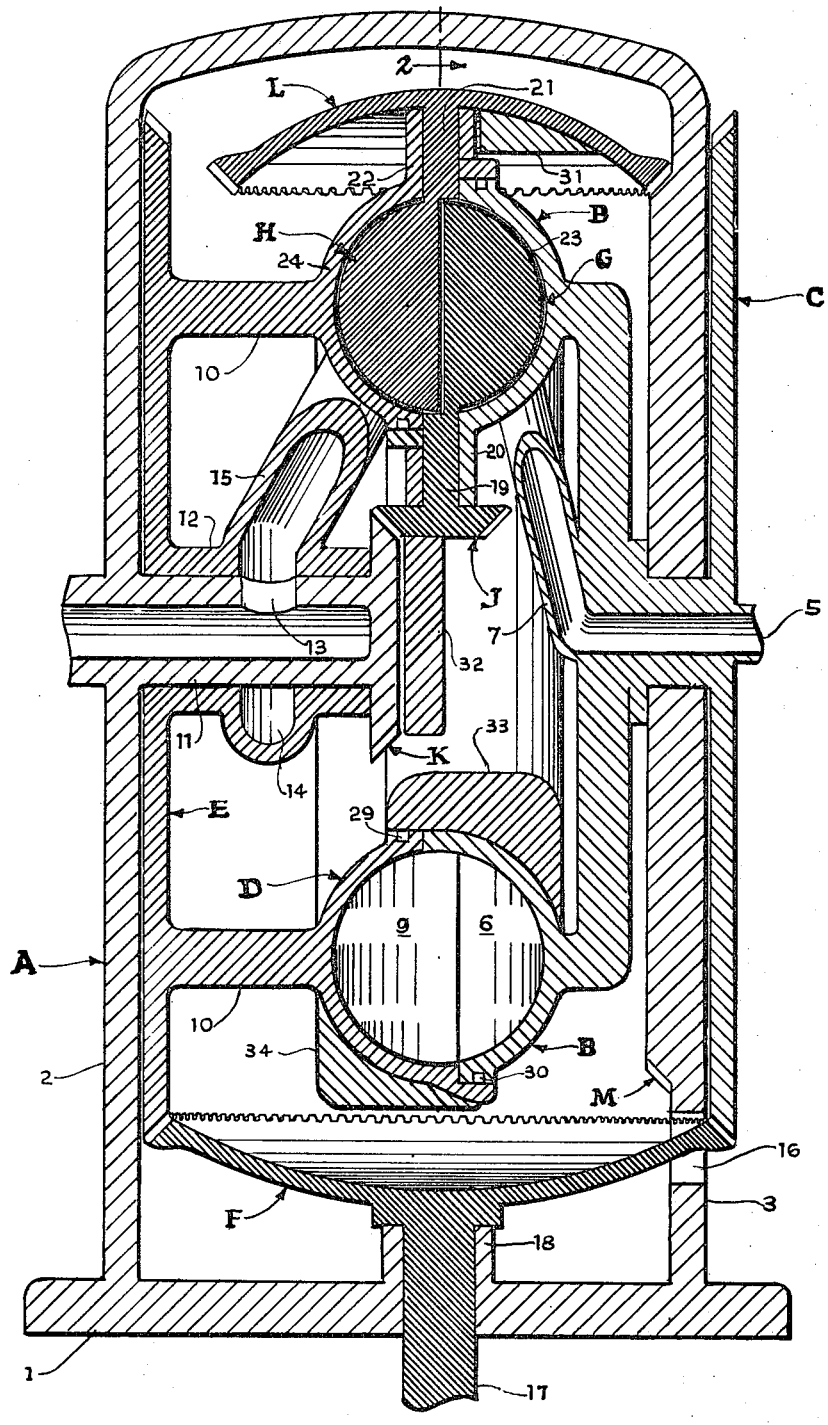
FIG. 1 is a vertical transverse section through the engine and it is taken along the line 1—1 of FIG. 2.
Figure 2:
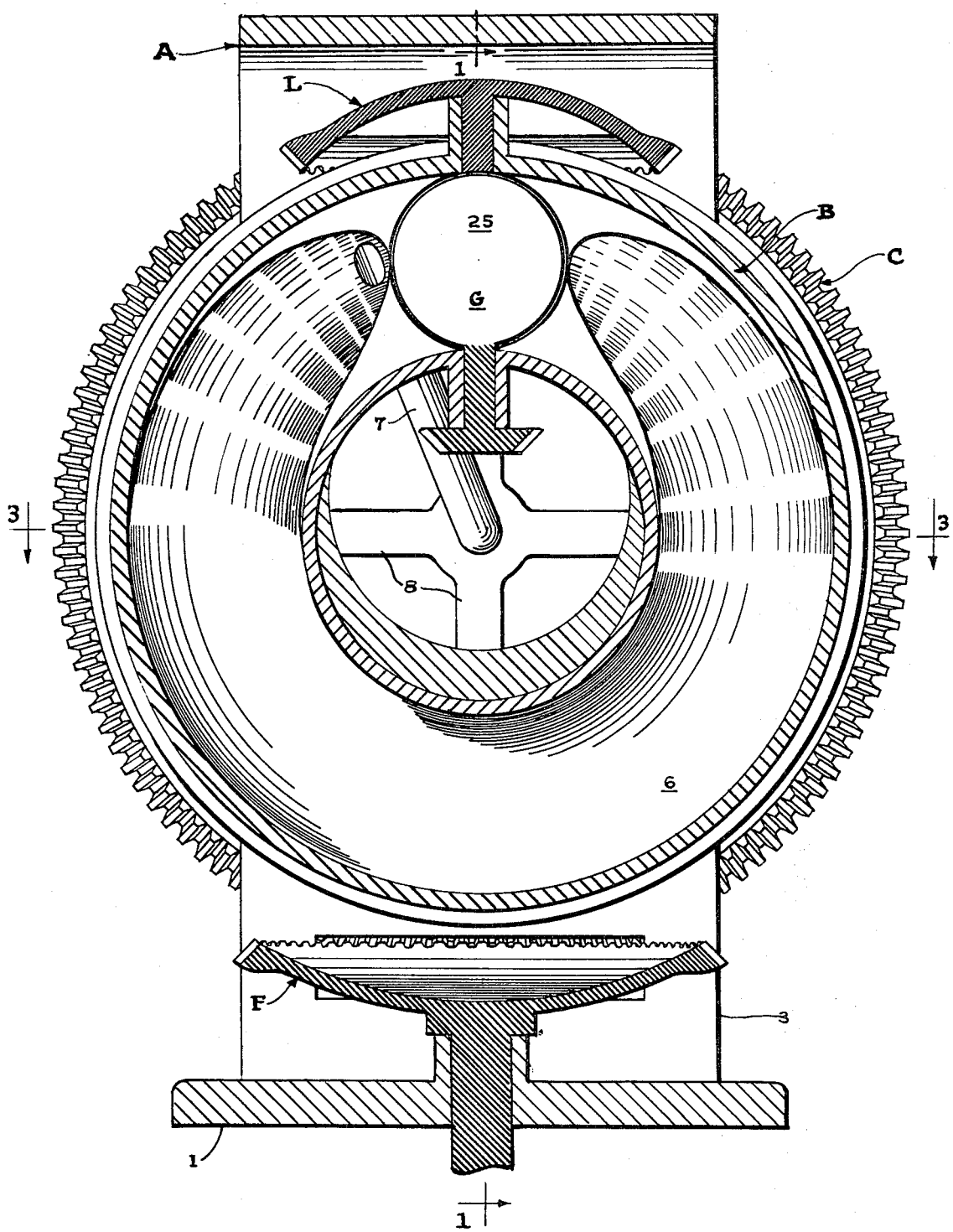
FIG. 2 is a vertical longitudinal section through the engine and it is taken along the line 2—2 of FIG. 1.

In carrying out my invention, I provide a chassis A that has a base 1 and upstanding parallel sides 2 and 3 that are interconnected at their upper ends by an integral arch-shaped portion 4, see FIGS. 1 and 2. A rotor B has a hollow shaft 5 that is rotatably mounted in the chassis side wall 3. The rotor B has a semi-toroidal combustion chamber 6 of the shape shown in FIGS. 1 and 2. The passage in the hollow shaft 5 communicates with an integral conduit 7 that in turn communicates with the semi-toroidal expansion chamber 6. FIG. 2 shows shows how the rotor B has a circular portion in which the toroidal chamber is formed and this circular portion is carried by a spider 8 that connects with the hollow shaft 5. No bearings are indicated to rotatably support the hollow shaft in the chassis side 3. The passage in the shaft 5 and the conduit 7 act as an inlet for the fluid or gas that is used for driving the engine. A bevel gear C is keyed to the hollow shaft 5 and is disposed on the outer side of the chassis side wall 3, see FIG. 1.

A second rotor D has a semi-toroidal expansion chamber 9 of the same size and shape as the semi-toroidal chamber 6 in the rotor B, see FIG. 1. The two chambers 6 and 9 face each other and combine to make an ever-changing expansion space as the two rotors revolve in opposite directions by a gear mechanism to be described hereinafter. The rotor D has a circular portion in which the toroidal chamber is formed and this portion is supported by integral arms 10 that extend to a second bevel gear E. The chassis side wall 2 has an integral, hollow and cylindrical support 11 whose axis coincides with the axis of the hollow shaft 5. The bevel gear E has an integral hollow shaft 12 that is rotatably mounted on the portion of the stationary cylindrical support 11 that extends inwardly from the chassis side wall 2. It will be noted from FIG. 1 that the hollow cylindrical support 11 has a closed inner end and it is provided with an opening 13. The hollow shaft 12 has an annular recess 14 that communicates with the opening 13 and a conduit 15 connects the recess 14 with the interior of the semi-toroid chamber 9 in the rotor D. The conduit 15 and the passage in the hollow cylindrical support 11 constitute an exhaust passage for the fluid or gas as it leaves the toroid chamber.

It will be noted from FIG. 1 that both of the bevel gears C and E mesh with a third bevel gear F. The side wall 3 of the chassis A has an opening 16 therein through which a portion of the bevel gear F extends so that the gears C and F can mesh. The bevel gear F is rotated by the bevel gears C and E and it has a shaft 17 that is rotatably mounted in a thrust bearing 18 that is carried by the base 1. The rotor B, and its bevel gear C will rotate as a unit and in an opposite direction to the rotation of the rotor D, and its bevel gear E. Both bevel gears C and E will rotate the driven bevel gear F and the power or output shaft 17. It is obvious that helical gears or spiral gears could be used.

A novel feature of my invention is the provision of a thrusthead for each rotor, these thrustheads being of a hemi-spherical shape and rotatably mounted on axes that extend radially from the axis of rotation of the two rotors B and D that rotate about a common axis in opposite directions. Both thrustheads G and H are shown in section in FIG. 1 and at the instant of passing each other as the two rotors B and D rotate in opposite directions. The thrust head G is hemi-spherical in shape and is carried by a radially extending shaft 19 that extends inwardly and is provided with a bevel gear J at its inner end. The rotor B has a bearing 20 that rotatably supports the shaft 19. The bevel gear J meshes with a stationary bevel gear K that is integral with the closed inner end of the hollow cylindrical support 11. The center of the bevel gear K lies on the axis of rotation for the two rotors B and D and it is larger than the gear J, the ratio between the two gears being such that the smaller diameter bevel gear J will make two complete rotations on its own radial axis as the rotor B carries the gear around the stationary bevel gear K through a complete circle of 360°.

The thrust head H is hemispherical in shape and is carried by a radially extending shaft 21 that extends outwardly and is provided with a bevel gear L at its outer end. The rotor D has a bearing 22 that rotatably supports the shaft 21. The bevel gear L meshes with a stationary bevelled ring gear M whose teeth are formed on the inner surface of the chassis side wall 3. It is obvious that in actual practice the bevel ring gear M would be a separate stationary gear affixed to the inner surface of the chassis side wall 3. The center of the bevel gear M lies on the axis of rotation for the two rotors B and D and it is larger than the gear L, the ratio between the two gears being such that the smaller diameter bevel gear L will make two complete rotations on its own axis as the rotor D carries the gear around the stationary bevel gear M through a complete circle of 360°.

FIGS. 1 and 2 show the hemi-spherical thrust head G rotatably received in a hemi-spherical recess 23 that is formed in the rotor B and is positioned between the adjacent ends of the near-toroidal expansion chamber 6. The same arrangement is made for the hemi-spherical thrust head H because the rotor D is provided with a hemi-spherical recess 24 for rotatably receiving the thrust head and the recess is positioned between the adjacent ends of the semi-toroidal expansion chamber 9. The semi-toroidal chamber 9 is the same in size and shape as the semi-toroidal chamber 6 and, therefore, no face view of the rotor D and its semi-toroidal chamber 9 is shown. The thrust head G in its rotation on its radial axis will move into the semi-toroidal groove 9 provided in the adjacent rotor D and the planar face 25 of the thrust head will move into the semi-toroidal chamber 9 in the rotor C as the rotor B rotates counterclockwise, see the arrows 26 in FIGS. 4 and 5, and as the rotor C rotates clockwise (see arrows 27) so as to present a moving closure in the chamber 9. The same is true of the thrust head H as it is rotated on its radial axis. Its planar face 28 will move into the adjacent semi-toroidal chamber 6 in the rotor B as the latter rotor rotates in an opposite direction to the rotor C.

Since both thrust heads G and H operate in the same manner, a series of partial sections showing the rotation of the thrust head H in successive increments of 45° while its supporting rotor D simultaneously rotates in a clockwise direction in successive increments of 22½° will suffice for both thrust heads. FIG. 6 shows the planar faces of the two thrust heads G and H facing each other and this corresponds with FIGS. 1 and 2 where the two thrust heads are in the same relative positions although only the thrust head G is shown in FIG. 2 Note from FIG. 6 how the recess or pocket 23 receives the thrust head G while the recess or pocket 24 in the rotor D receives the thrust head H. The ends of the semi-toroidal chamber 6 in the rotor B and the ends of the semi-toroidal chamber 9 in the rotor D are also shown.

The rotor D rotates clockwise through an arc of 22½° and the rotor B rotates counterclockwise through a similar arc for the position of the parts in FIG. 7. The thrust head H has rotated on its radial axis so that the planar face 28 will now extend into the toroidal chamber 6 in the rotor B. Note how the wall of the chamber 6 increases in depth and cross section curvature so that the circular edge of the planar face 28 will make a fluid tight seal with the adjacent surface of the chamber 6 at all times. In FIG. 8 the rotors B and D are moved on through arcs of 22½° in opposite rotational directions and the thrust head H has rotated on its radial axis another 45°. The cross section through the semi-toroid chamber 9 in the rotor D is deepest at this point and the planar face 28 lies in a plane that intersects the axis of rotation of the two rotors.

FIGS. 9, 10 and 11 show additional successive increments of 22½° each through which the two rotors B and D continue to rotate in opposite directions about their common axis. The cross section through the semi-toroidal chamber 6 remains the same in all three of these views. The hemi-spherical surface covers the cross sectional area in the chamber 6 so that the thrust head acts as a continuously moving closure therein. The thrust head rotates on its radial axis through successive increments of 45° each and an arcuate edge of the circular planar surface 28 sweeps through the pocket cavity of recess 24.

FIGS. 12, 13 and 14 show successive stages where the thrust head H completes one rotation on its radial axis of 360°, while the two rotors B and D complete opposite rotations through arcs of 180° each. This will bring the thrust head H in FIG. 14 into face to face relation with the thrust head G. The same movements repeat themselves during each half circle rotation of the rotors in opposite directions. Note that the chamber 6 gets smaller in cross sectional area as the thrust head H rotates on its radial axis back into the hemispherical recess 24.

OPERATION

Figure 3:
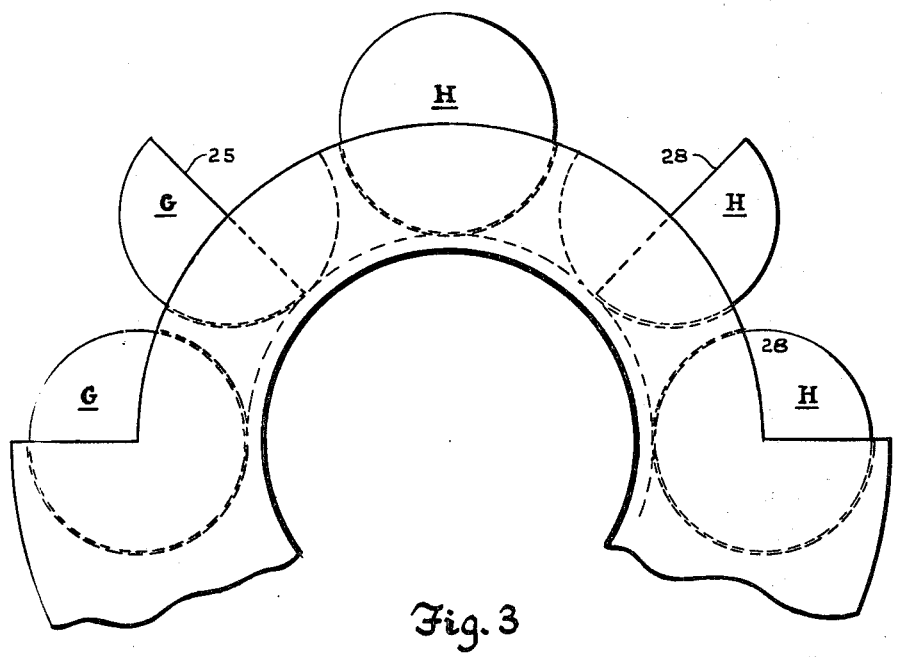
FIG. 3 is a diagrammatic front view showing the toroidal expansion chamber with the outer arcuate portion of 180° being removed in order to illustrate the two hemispherical thrustheads in various positions with respect to each other during the rotation of the rotors in opposite directions through arcs of 90° each. Both thrustheads are shown with their planar surfaces facing each other, note the top complete circle in the toroid chamber which compares with the same two thrustheads facing each other in FIG. 1. The second positions of the two thrustheads in FIG. 3 is when the two rotors have rotated in opposite directions through arcs of 45° and the thrustheads have been rotated on their own radial axes through arcs of 90°, note the two thrustheads with their planar faces lying in planes that extend at 90° to each other. The third positions of the two thrustheads in FIG. 3 is when the two rotors have rotated in opposite directions through arcs of 90° and the thrustheads have been rotated on their own radial axes through arcs of 180° from their starting positions, note the two thrustheads with their planar faces lying in planes that parallel each other and are normal to the axis of rotation of the two rotors.

From the foregoing description of the various parts of the engine, the operation thereof will be readily understood. FIG. 2 shows the fluid inlet 7 into one end of the semi-toroidal expansion chamber 6. The rotor B in rotating counterclockwise will carry the thrust head G there-with and FIG. 3 shows how the thrust head continues to rotate on its own radial axis. At the same time the rotor D in rotating clockwise will carry the thrust head H with it and the latter will continue to rotate on its own radial axis. The "dead spot" of the engine is when the two thrust heads G and H have their planar surfaces facing each other. The provision of two engines operating on the same shaft and each having its "dead spots" angularly disposed with one another, will prevent any stalling of either engine on its "dead spot."

FIG. 7 shows the two rotors B and D each rotated 22½° in opposite directions from the "dead spot" position of the two thrust heads G and H in FIG. 6. All that is necessary to start the engine is to have the inlet 7 in semi-toroidal compartment 6 have communication with compartment 9 so that the incoming fluid under pressure can press against the planar face 25 of the thrust head G as the latter acts as a sliding closure in the constantly enlarging compartment 9 due to the rotation of the rotor D. At the same time the thrust head H, not shown in FIGS. 7 to 13, inclusive, and carried by the rotor D, will travel along the constantly enlarging semi-toroidal combustion chamber 6 and the incoming fluid under pressure from the inlet 7 will press against the planar face 28 of this thrust head. Therefore, there will be a power stroke delivered simultaneously against both thrust heads G and H for rotating their rotors B and D, respectively, in opposite directions. The gear train will cause each rotor to rotate at the same speed. At all times the thrust heads will fill the cross sectional areas of the toroidal expansion chamber in the opposite rotor that is rotating in the opposite direction. The power stroke will continue for substantially 180° of each rotor as it rotates in an opposite direction to its companion rotor. This is depicted by showing the thrust head H in its various positions while its rotor D rotates through 180°.

At the point shown in FIG. 14, the two thrust heads G and H pass each other again and the power cycle will immediately repeat itself. The exhaust stroke lies in the ever-decreasing size of the toroidal chamber made by the two semi-toroidal expansion chambers 6 and 9 and the two thrust heads G and H moving therein. The exhaust gases or fluid are forced out through the exhaust pipe 15 and hollow cylindrical member 11. The two semi-toroidal chambers 6 and 9 constantly increasing and decreasing in size can be used in certain adaptations as an internal combustion engine where the explosive gas would be ignited by a spark plug, not shown, at full compression of the gas. It is possible to have the engine operate on a two- or four-cycle principle.

There is almost a constant power stroke and a constant exhaust stroke. When using two of the engines on the same shaft, one engine can be at full power stroke while the other is passing through its "dead spot" and vice versa. No more than two engines on the same shaft would be needed to overcome any "dead spot" of either engine. The engine can be used as a slow speed engine with zero as its minimum limit. There is a very high power to weight ratio achieved with the engine. The rotors provide a constant leverage on the load for most of the cycle. All rotating parts are counterbalanced by weighted portions 31, 32, 33 and 34, see FIG. 1.

The adaptability of the engine is universal. It lends itself to conversion of any fluid under pressure into mechanical energy or vice versa. It can be used for pumps or blowers. Each thrust head rotates on a radial axis of the rotor that carries it and it slides in the semi-toroidal expansion chamber provided in the adjacent rotor. Each hemispherical thrust head is rotatable in its own hemispherical pocket or recess and it swings out from this pocket and into the adjacent portion of the semi-toroid expansion chamber of the other rotor and back into its pocket for each rotation of its rotor through 180°. The two rotors B and D act as flywheels and they help to smooth out power pulsations and tend to give a smooth non-variable fluid power. The engine is a positive displacement engine as against or in contrast to a turbine. The engine can start with a load and direct drive. It is obvious that the fluid inlet could be cut off during any portion of the power stroke although such a mechanism is not shown.

Figure 4:
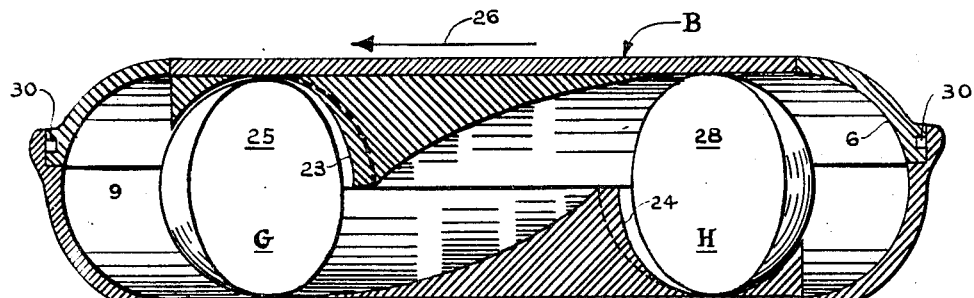
FIG. 4 is a top plan view of FIG. 3 and shows the two hemi-spherical thrustheads spaced 90° apart and rotated on their own radial axes so that their planar surfaces lie in two planes that intersect along the axis of rotation of the two rotors and from a right angle with respect to each other.
Figure 5:
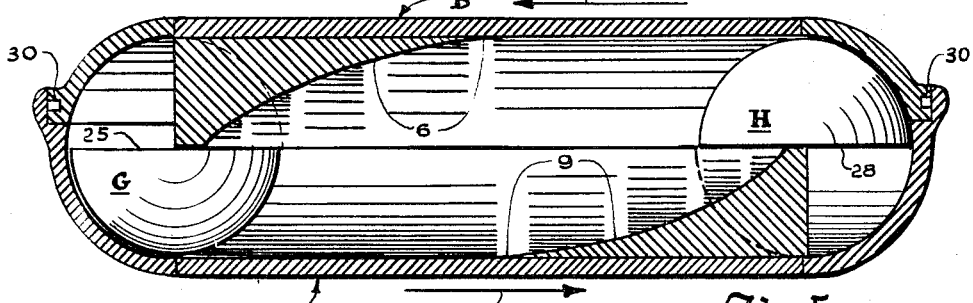
FIG. 5 is a section similar to FIG. 4 except that the two rotors have rotated 45° farther in opposite directions and the two thrustheads have rotated on their radial axes 90° more.

FIGS. 1, 4 and 5 show how the two rotors B and D are sealed together (see sealing devices 29 and 30) while still permitting rotation between the two in opposite directions. Any type of sealing structure can be used.

By the term thrust head, I mean a rotating closure unit, the arrangement being such that it accomplishes a closure of the semi-toroid opposite it at all times. By the term toroidal, I mean a true toroid excepting that the annular chamber is restricted at a certain point in the rotor to receive a thrust head.

I claim:
1. A device of the type described comprising:
 (a) a pair of rotors, each being rotatable about a common axis and in opposite directions;
 (b) each rotor having a semi-toroidal chamber therein that faces the semi-toroidal chamber in the other rotor to form a complete chamber each toroid chamber having its ends spaced from each other;
 (c) each rotor carrying a thrust head that is rotatable about its own axis, said thrust head being disposed between the ends of the semi-toroidal chamber in the same rotor;
 (d) means for operatively connecting said rotors together so that they will rotate in opposite directions, said means also rotating said thrust heads so that they will freely pass each other during the counter rotation of the rotors;
 (e) means for delivering an expanding fluid into the chamber portion lying between the two thrust heads for moving them away from each other;
 (f) means for exhausting the fluid from the chamber portion where the two thrust heads are moving toward each other; and
 (g) an output shaft operatively connected to said rotors.

2. The combination as set forth in claim 1: and in which
 (a) each thrust head is hemi-spherical in shape; and
 (b) each semi-toroidal chamber has a wall shaped so as to make a seal with the surface of the thrust head as the latter is rotated about its radial axis, the planar surfaces of said thrust heads paralleling each other and being normal to the axis of rotation of the rotors as the thrust heads pass each other.

3. The combination as set forth in claim 1: and in which
 (a) one of the thrust heads has integral a shaft which extends radially outwardly and is rotatably carried by one of the rotors; and
 (b) the other thrust head has integral a shaft which extends radially inwardly and is rotatably carried by the other rotor.

4. The combination as set forth in claim 1: and in which
 (a) a chassis is provided for the rotors;
 (b) one of the rotors having a hollow axle rotatably mounted in the chassis, the means for delivering the fluid to the chamber including an inlet passage communicating with the hollow axle and with the semi-toroidal chamber in the same rotor;
 (c) a hollow cylindrical support carried by the chassis and axially aligned with the axis of said hollow axle;
 (d) the other rotor being rotatably carried by said hollow cylindrical support, the means for exhausting the fluid including an exhaust pasage communicating with the chamber in this rotor and with said hollow cylindrical support to permit the fluid to exhaust therethrough; and
 (e) gearing means rotating the thrust heads through two complete revolutions on their own axes for each single revolution of the rotors through 360°.

5. A device of the type described comprising:
(a) a chassis;
(b) a first rotor having a first hollow axle rotatably mounted in said chassis and having a first toroidal chamber with the ends of the chamber being spaced apart; an inlet passage communicating with the hollow axle and with one end of the chamber;
(c) a hollow cylindrical support carried by the chassis and being axially aligned with the axis of said hollow axle;
(d) a second rotor having a second hollow axle rotatably mounted on said hollow cylindrical support and having a second semi-toroidal chamber that faces the first semi-toroidal chamber, the ends of the second semi-torodial chamber being spaced apart; an exhaust passage communicating with the second hollow axle and with one end of the second chamber;
(e) a first partially-spherical thrust head rotatable in a first pocket lying between the spaced apart ends of said first chamber;
(f) a second partially-spherical thrust head rotatable in a second pocket lying between the spaced apart ends of said second chamber;
(g) a first shaft for rotating said first thrust head and extending radially outwardly from the first rotor and being rotatably carried thereby;
(h) a first stationary gear on the chassis and a gear on said first radial shaft meshing with it for rotating said first thrust head two complete revolutions about its radial axis for each single revolution of said first rotor;
(i) a second shaft for rotating said second thrust head and extending radially inwardly from the second rotor and being rotatably carried thereby;
(j) a second stationary gear on said hollow cylindrical support and a gear on said second radial shaft meshing with the second stationary gear for rotating said second thrust head two complete revolutions about its radial axis for each single revolution of said second rotor;
(k) a driven shaft;
(l) gearing means operatively connecting said first and second hollow rotor shafts with said driven shaft for keeping the rotors rotating in unison and in opposite directions and for rotating the driven shaft; and
(m) means for delivering an expandible fluid into said first hollow shaft.

6. The combination as set forth in claim 5: and in which (a) each toroidal chamber has a wall shaped so as to make a seal with the surface of the thrust head received therein as the latter is rotated about its radial axis, the planar surfaces of said thrust heads paralleling each other and being normal to the axis of rotation of the rotors as the thrust heads pass each other.

7. In a device of the type described:
(a) a pair of rotors rotatable in opposite directions on a common axis, each rotor having a semi-toroidal chamber with the two chambers facing each other on opposite sides of a common plane that is normal to the axis;
(b) a thrust head carried by each rotor and being rotatable about its axis, each thrust head axis extending radially from the common axis of the two rotors, each thrust head being positioned between the ends of the semi-toroidal chamber of the rotor in which it is carried and being rotatable about its own radial axis to extend into the adjacent portion of the toroidal chamber in the other rotor to act as a moving closure member therein, each thrust head having a planar surface adapted to coincide with the common plane between the rotors at the moment the counter rotation of said rotors causes said thrust heads to pass each other; and
(c) means for synchronizing the counter rotation of the rotors and the rotation of the thrust heads so that the planar surface of each thrust head will face and parallel the planar surface of the other thrust head as the two thrust heads pass each other during the counter rotation of the rotors.

References Cited

UNITED STATES PATENTS

| 926,731 | 7/1909 | Dowling | 103—143 XR |
| 1,135,632 | 4/1915 | Stieb | 91—150 |
| 2,090,280 | 8/1937 | Biermann | 91—150 |
| 2,091,577 | 8/1937 | Adler et al. | 123—8 |
| 2,552,661 | 5/1951 | Barrett | 230—156 |

FOREIGN PATENTS

| 708,806 | 5/1931 | France. |

CARLTON R. CROYLE, Primary Examiner

A. D. HERRMANN, Assistant Examiner

U.S. Cl. X.R.

60—39.15, 39.75, 102